(12) United States Patent
Takahashi et al.

(10) Patent No.: US 10,586,954 B2
(45) Date of Patent: Mar. 10, 2020

(54) ELECTRONIC DEVICE INCLUDING SECONDARY BATTERY

(71) Applicant: Semiconductor Energy Laboratory Co., LTD., Atsugi-shi, Kanagawa-ken (JP)

(72) Inventors: Minoru Takahashi, Nagano (JP); Yuugo Goto, Kanagawa (JP); Yumiko Yoneda, Kanagawa (JP); Takuya Miwa, Kanagawa (JP); Ryota Tajima, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/717,615

(22) Filed: May 20, 2015

(65) Prior Publication Data

US 2015/0340664 A1     Nov. 26, 2015

(30) Foreign Application Priority Data

May 23, 2014  (JP) ................................. 2014-107546

(51) Int. Cl.
*H01M 2/02*       (2006.01)
*H01M 10/04*      (2006.01)
*H01M 2/30*       (2006.01)

(52) U.S. Cl.
CPC ......... *H01M 2/0275* (2013.01); *H01M 2/021* (2013.01); *H01M 2/30* (2013.01); *H01M 10/0436* (2013.01); *H01M 2/0287* (2013.01); *H01M 2220/30* (2013.01)

(58) Field of Classification Search
CPC ...... H01M 2/0275; H01M 2/021; H01M 2/30; H01M 2/0287
See application file for complete search history.

(56) References Cited

U.S. PATENT DOCUMENTS 3,977,906 A  *  8/1976  Beatty ................... H01M 2/021
                                                        429/185
5,339,091 A       8/1994  Yamazaki et al.
(Continued)

FOREIGN PATENT DOCUMENTS

EP     3026729 A     6/2016
JP     58-197655 A   11/1983
(Continued)

*Primary Examiner* — Jimmy Vo
(74) *Attorney, Agent, or Firm* — Nixon Peabody LLP; Jeffrey L. Costellia (57) ABSTRACT

In the case where a film, which has lower strength than a metal can, is used as an exterior body of a secondary battery, a current collector provided in a region surrounded by the exterior body, an active material layer provided on a surface of the current collector, or the like might be damaged when force is externally applied to the secondary battery. A secondary battery which is resistant to external force is obtained. An opening is provided in a central portion of the secondary battery, and a terminal is formed in the opening. An outer edge of the secondary battery is fixed by thermocompression bonding. In addition, the central portion of the secondary battery is fixed by thermocompression bonding, so that the amount of bending is limited even when the outer edge portion of the secondary battery is bent.

17 Claims, 7 Drawing Sheets

(56) References Cited

U.S. PATENT DOCUMENTS

| | | | |
|---|---|---|---|
| 5,654,111 A * | 8/1997 | Minomiya | H01M 2/0275 429/127 |
| 6,599,659 B1 | 7/2003 | Endo et al. | |
| 6,664,005 B2 | 12/2003 | Kezuka et al. | |
| 7,764,046 B2 | 7/2010 | Osada | |
| 7,944,172 B2 | 5/2011 | Osada | |
| 8,040,456 B2 | 10/2011 | Yamazaki et al. | |
| 8,192,863 B2 | 6/2012 | Best et al. | |
| 8,218,105 B2 | 7/2012 | Yamazaki et al. | |
| 8,319,725 B2 | 11/2012 | Okamoto et al. | |
| 8,367,440 B2 | 2/2013 | Takayama et al. | |
| 8,415,208 B2 | 4/2013 | Takayama et al. | |
| 8,427,420 B2 | 4/2013 | Yamazaki et al. | |
| 8,432,018 B2 | 4/2013 | Dozen et al. | |
| 8,597,830 B2 | 12/2013 | Kawakami et al. | |
| 8,634,041 B2 | 1/2014 | Yamazaki et al. | |
| 8,785,030 B2 | 7/2014 | Ueda | |
| 8,847,556 B2 | 9/2014 | Osada | |
| 8,852,796 B2 | 10/2014 | Kim | |
| 8,929,085 B2 | 1/2015 | Franklin et al. | |
| 8,940,429 B2 | 1/2015 | Spare | |
| 9,425,440 B2 | 8/2016 | Kwon et al. | |
| 10,135,097 B2 | 11/2018 | Spare | |
| 2003/0171784 A1 * | 9/2003 | Dodd | H01M 2/14 607/36 |
| 2004/0080048 A1 | 4/2004 | Haruta et al. | |
| 2005/0088365 A1 | 4/2005 | Yamazaki et al. | |
| 2005/0189906 A1 | 9/2005 | Sun | |
| 2007/0259271 A1 * | 11/2007 | Nanno | H01M 2/0267 429/318 |
| 2009/0071952 A1 | 3/2009 | Kuwabara | |
| 2010/0081057 A1 | 4/2010 | Liu et al. | |
| 2010/0239907 A1 | 9/2010 | Izumi | |
| 2010/0301279 A1 | 12/2010 | Nesper et al. | |
| 2010/0303706 A1 | 12/2010 | Wallace et al. | |
| 2011/0024750 A1 | 2/2011 | Yamazaki et al. | |
| 2011/0121240 A1 | 5/2011 | Amine et al. | |
| 2011/0227000 A1 | 9/2011 | Ruoff et al. | |
| 2011/0287341 A1 | 11/2011 | Inoue et al. | |
| 2011/0294009 A1 | 12/2011 | Kawakami et al. | |
| 2012/0002349 A1 | 1/2012 | Ito et al. | |
| 2012/0202101 A1 | 8/2012 | Ueda | |
| 2012/0244408 A1 | 9/2012 | Huang et al. | |
| 2012/0308891 A1 | 12/2012 | Todoriki et al. | |
| 2013/0101884 A1 | 4/2013 | Ueda | |
| 2013/0134051 A1 | 5/2013 | Takahashi et al. | |
| 2013/0177798 A1 | 7/2013 | Ueda | |
| 2013/0181955 A1 | 7/2013 | Okamoto et al. | |
| 2013/0209868 A1 | 8/2013 | Suzuta et al. | |
| 2013/0214324 A1 | 8/2013 | Takayama et al. | |
| 2013/0224562 A1 | 8/2013 | Momo | |
| 2013/0252065 A1 | 9/2013 | Ueda | |
| 2013/0252088 A1 | 9/2013 | Kuriki et al. | |
| 2013/0252089 A1 | 9/2013 | Kuriki | |
| 2013/0273405 A1 | 10/2013 | Takahashi et al. | |
| 2013/0314346 A1 | 11/2013 | Yamazaki et al. | |
| 2014/0113184 A1 | 4/2014 | Hamel et al. | |
| 2015/0002093 A1 | 1/2015 | Osada | |
| 2015/0022957 A1 | 1/2015 | Hiroki et al. | |
| 2015/0140397 A1 | 5/2015 | Tajima et al. | |
| 2015/0147626 A1 | 5/2015 | Tajima et al. | |
| 2015/0162590 A1 | 6/2015 | Takahashi et al. | |
| 2019/0074549 A1 | 3/2019 | Spare | |

FOREIGN PATENT DOCUMENTS

| | | |
|---|---|---|
| JP | 59-189554 A | 10/1984 |
| JP | 63-015796 A | 1/1988 |
| JP | 07-006771 A | 1/1995 |
| JP | 09-213377 A | 8/1997 |
| JP | 2000-173559 A | 6/2000 |
| JP | 2000-285881 A | 10/2000 |
| JP | 2000-285904 A | 10/2000 |
| JP | 2001-052762 A | 2/2001 |
| JP | 2001-093581 A | 4/2001 |
| JP | 2003-123706 A | 4/2003 |
| JP | 2003-174153 A | 6/2003 |
| JP | 2003-187759 A | 7/2003 |
| JP | 2005-129393 A | 5/2005 |
| JP | 2005-332591 A | 12/2005 |
| JP | 2006-331874 A | 12/2006 |
| JP | 2007-066619 A | 3/2007 |
| JP | 2007-123081 A | 5/2007 |
| JP | 2007-234466 A | 9/2007 |
| JP | 2009-016275 A | 1/2009 |
| JP | 2010-135231 A | 6/2010 |
| JP | 2011-060576 A | 3/2011 |
| JP | 2011-129378 A | 6/2011 |
| JP | 2012-142153 A | 7/2012 |
| JP | 2012-199060 A | 10/2012 |
| JP | 2013-048041 A | 3/2013 |
| JP | 2013-048042 A | 3/2013 |
| JP | 2013-535774 | 9/2013 |
| KR | 2014-0033195 A | 3/2014 |
| WO | WO-2012/009423 | 1/2012 |

* cited by examiner

ELECTRONIC DEVICE INCLUDING SECONDARY BATTERY

BACKGROUND OF THE INVENTION

1. Field of the Invention

One embodiment of the present invention relates to an object, a method, or a manufacturing method. In addition, the present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to an electronic device and its operating system.

Note that electronic devices in this specification generally mean devices including secondary batteries, and electro-optical devices including secondary batteries, information terminal devices including secondary batteries, and the like are all electronic devices.

2. Description of the Related Art

Electronic devices carried around by the users and electronic devices worn by the users have been actively developed. For example, a thin portable electronic book is disclosed in Patent Document 1.

Electronic devices carried around by the users and electronic devices worn by the users are powered by secondary batteries. It is desired that an electronic device carried around by the user can be used for a long period. In order to achieve this, a high-capacity secondary battery may be used. Since a high-capacity secondary battery is large in size, its incorporation in an electronic device increases the weight of the electronic device. Thus, small or thin high-capacity secondary batteries that can be incorporated in portable electronic devices are under development.

Metal cans are used as exterior bodies of secondary batteries, and electrolytes and the like are contained in the metal cans.

REFERENCE

[Patent Document 1] Japanese Published Patent Application No. S63-15796

SUMMARY OF THE INVENTION

A metal can used as an exterior body has a problem of increasing the weight of a secondary battery. Moreover, it is difficult to manufacture a thin metal can by molding and fabricate a secondary battery using a thin metal can, in order to obtain a thin secondary battery.

The use of a film (also referred to as a laminate film) including a stack of metal foil (e.g., aluminum foil and stainless steel foil) and a resin (heat-seal resin) as an exterior body allows fabrication of a secondary battery that is thinner and more lightweight than a secondary battery using a metal can.

In order that a user can comfortably wear a display device used while being worn on a human body, the display device needs to have a light weight and a small size, and in addition, the whole electronic device including a driver device for the display device and a power source needs to have a light weight.

An object is to provide an electronic device having a novel structure, specifically, an electronic device having a novel structure that can be changed in appearance in various ways.

Another object of one embodiment of the present invention is to provide a novel power storage device, a novel secondary battery, or the like. Note that the descriptions of these objects do not disturb the existence of other objects. In one embodiment of the present invention, there is no need to achieve all the objects. Other objects will be apparent from and can be derived from the descriptions of the specification, the drawings, the claims, and the like.

In the case where a film, which has lower strength than a metal can, is used as an exterior body of a secondary battery, a current collector provided in the exterior body, an active material layer provided on a surface of the current collector, or the like might be damaged when force is externally applied to the secondary battery. The current collector includes a projection (also referred to as an electrode tab portion) for connection to a lead electrode. When the secondary battery is bent by external force, part of the current collector suffers damage such as a crack in the vicinity of the projection (electrode tab portion), leading to breakage of the secondary battery. Note that the electrode tab portion is not provided with an active material layer.

A thin secondary battery using a laminate film for its exterior body has an electrode shape that is likely to be cracked. That is, an electrode in the thin secondary battery includes a projection (electrode tab portion) for leading a lead electrode.

A thin secondary battery having a novel structure in which a laminate film is used as an exterior body is resistant to external force generated by bending, includes an electrode tab portion in a central portion, and has the appearance of being point-symmetric with respect to the electrode tab portion.

Disclosed in this specification is a secondary battery having an electrolytic solution sealed in an exterior body. The secondary battery includes a first current collector and a second current collector over the first current collector. The external body has an opening. A portion of the first current collector protrudes into the opening. A portion of the second current collector protrudes into the opening. The exterior body is a film.

In the above-described structure, the portion of the first current collector which protrudes into the opening may be a terminal of a positive electrode, and the portion of the second current collector which protrudes into the opening may be a terminal of a negative electrode.

In the above-described structure, a separator may be provided between the first current collector and the second current collector. The first current collector may have a plurality of openings. The second current collector may have a plurality of openings. The plurality of openings provided in the first current collector or the second current collector make part of the current collector easily bendable and can control the bending position of the current collector.

An outer edge of the secondary battery is fixed by thermocompression bonding. Furthermore, the central portion of the secondary battery is fixed by thermocompression bonding, so that the amount of bending is limited even when the outer edge portion of the secondary battery is bent. In the secondary battery, a plurality of current collectors are provided and are surrounded by an exterior body, and a portion of the exterior body and a portion of the current collectors are fixed to each other. In the above structure, the opening in the secondary battery is a through-hole, i.e., the secondary battery has a hollow structure, and the portion of the exterior body and the portion of the current collectors are fixed to each other at the opening in the exterior body at the time of sealing. In the case where the secondary battery is bent while the opening located in roughly the central portion of the secondary battery when seen from above is fixed, a difference between the amount of deformation of the exterior body and the amount of deformation of the current collectors in a region where the exterior body and the current collectors are not fixed to each other, especially in the outer edge portion, can be decreased as compared with a conventional case. In the case where the plurality of current collectors are used, a difference in the amount of deformation between the uppermost current collector and the lowermost current collector can be decreased. That is, the degree of deformation with respect to deformation of the secondary battery can be decreased by fixing the central portion of the secondary battery by thermocompression bonding. A conventional rectangular secondary battery includes a terminal of a positive electrode (or a negative electrode) which protrudes from one side of the secondary battery, and is fixed in a portion where the side and a portion of current collectors overlap with each other. Therefore, in a region apart from the fixed side, there is a large difference between the amount of deformation of an exterior body and the amount of deformation of the current collectors, and also in an inner portion, there is a large difference in the amount of deformation between the uppermost current collector and the lowermost current collector. When there is a large difference in the amount of deformation between the uppermost current collector and the lowermost current collector, a region where a pair of current collectors, i.e., first and second current collectors, do not overlap with each other does not function as a battery, which leads to a decrease in capacity.

In the above-described structure, the central portion of the secondary battery is used for connection. Thus, when an element or a circuit is positioned so as to overlap with the central portion of the secondary battery, the length of a lead wiring (such as a lead line) can be decreased, and wiring resistance can be decreased. Positioning an element or a circuit (such as a regulator) so as to overlap with the central portion of the secondary battery is particularly effective in mounting the secondary battery in a thin device with a limited space inside a housing. A regulator generates and supplies power or a signal needed for each functional circuit from the secondary battery connected to the regulator. In charging the secondary battery, the regulator can prevent overcharge or the like of the secondary battery.

The area of the thin secondary battery can be increased by increasing the overall size of the secondary battery outward from the electrode tab portion.

A secondary battery having a novel structure can be obtained. In the case where a housing of an electronic device including the secondary battery having the novel structure is deformed, even when the secondary battery is deformed together with the housing, the amount of deformation with respect to deformation of the secondary battery can be decreased.

In addition, an electronic device having a novel structure which includes the secondary battery having the novel structure can be obtained.

The electronic device including the secondary battery is useful for workers in the manufacturing industry and the distribution industry, police officers, fire fighters, health workers, care workers, or sales people who need to use their hands freely, when it is worn on part of their bodies (part including a spherical surface, such as the elbow, the shoulder, the knee, or the head).

Note that the descriptions of these effects do not disturb the existence of other effects. One embodiment of the present invention does not necessarily achieve all the above effects. Other effects will be apparent from and can be derived from the descriptions of the specification, the drawings, the claims, and the like.

DETAILED DESCRIPTION OF THE INVENTION

Embodiments of the present invention will be described in detail below with reference to drawings. Note that the present invention is not limited to the following description, and it will be easily understood by those skilled in the art that various changes and modifications can be made. Furthermore, the present invention should not be construed as being limited to description of the embodiments.

Note that in each drawing described in this specification, the size, the layer thickness, or the region of each component may be exaggerated or each component may be omitted in some cases for clarity of the invention. Therefore, embodiments of the invention are not limited to such scales.

Note that ordinal numbers such as "first" and "second" in this specification and the like are used in order to avoid confusion among components and do not denote the priority or the order such as the order of steps or the stacking order. A term without an ordinal number in this specification and the like might be provided with an ordinal number in a claim in order to avoid confusion among components.

Embodiment 1

Figure 1A:
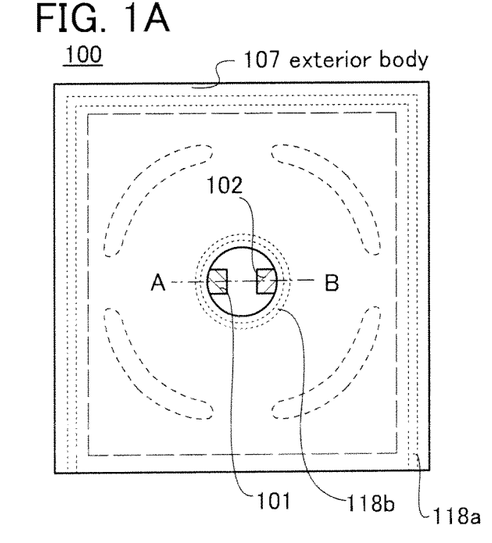
FIGS. 1A to 1E are top views and a cross-sectional view illustrating one embodiment of the present invention.

FIG. 1A illustrates an example of a schematic top view of a power storage unit.

A power storage unit 100 of one embodiment of the present invention includes at least a positive electrode 101, a separator 103, a negative electrode 102, and an electrolytic solution 120 in an exterior body 107. The power storage unit can have any of a variety of structures, and a film is used for formation of the exterior body 107 in this embodiment.

In this embodiment, one stacked-layer film having two circular openings is folded such that the two openings overlap with each other, and edges of the openings are bonded by thermocompression bonding. In addition, outer edges (three sides) are bonded by thermocompression bonding.

Alternatively, a first stacked-layer film having one circular opening and a second stacked-layer film having one circular opening may be stacked such that the two openings overlap with each other, and edges of the openings and four outer sides may be sealed by thermocompression bonding.

Figure 1B:
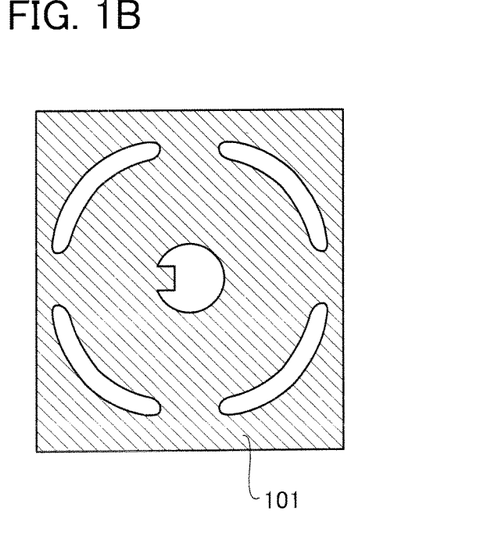

FIG. 1B illustrates an example of a top view of the positive electrode 101. The positive electrode 101 has an opening overlapping with an opening in the stacked-layer film, where an electrode tab portion protrudes. The electrode tab portion is a terminal for connection to an external wiring. Note that the positive electrode 101 refers to the one including a current collector (e.g., aluminum) with one surface or opposite surfaces each provided with a positive electrode active material layer and the like. The positive electrode active material layer is not formed in the electrode tab portion, i.e., a region of the current collector which serves as a terminal.

Figure 1C:
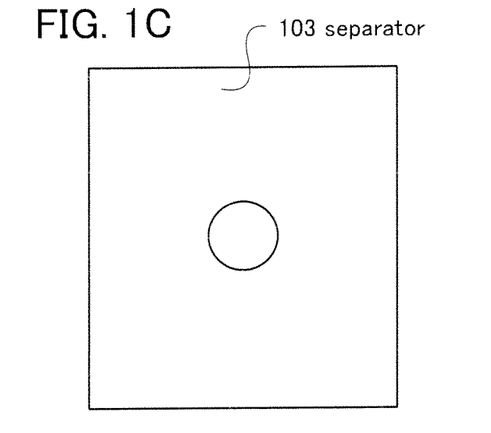
Figure 1D:
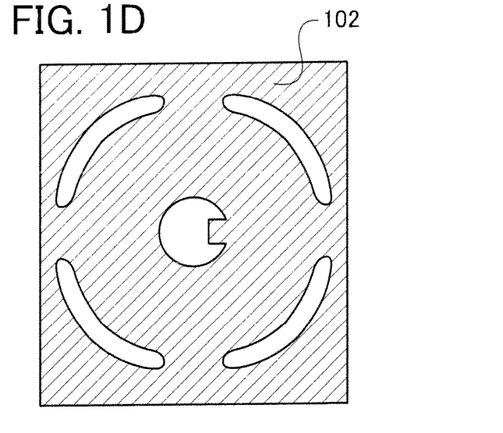

FIG. 1D illustrates an example of a top view of the negative electrode 102. The negative electrode 102 also has an opening overlapping with the opening of the stacked-layer film, where an electrode tab portion protrudes. The negative electrode 102 refers to the one including a current collector (e.g., copper) with one surface or opposite surfaces each provided with a negative electrode active material layer and the like. The negative electrode active material layer is not formed in the electrode tab portion, i.e., a region of the current collector which serves as a terminal.

In the power storage unit of this embodiment, for example, the separator 103 has a thickness of approximately 15 μm to 30 μm, the current collector of the positive electrode 101 has a thickness of approximately 10 μm to 40 μm, the positive electrode active material layer has a thickness of approximately 50 μm to 100 μm, the negative electrode active material layer has a thickness of approximately 50 μm to 100 μm, and the current collector of the negative electrode 102 has a thickness of approximately 5 μm to 40 μm.

FIG. 1C illustrates an example of a top view of the separator 103 provided between the positive electrode 101 and the negative electrode 102. The separator also has an opening overlapping with the opening in the stacked-layer film. Although a sheet-like separator may be used as the separator 103 in FIG. 1C, a bag-like one may alternatively be used. Furthermore, one separator may be bent and provided in the exterior body 107 such that the positive electrode (or the negative electrode) is located between facing surfaces of the bent separator.

Figure 1E:
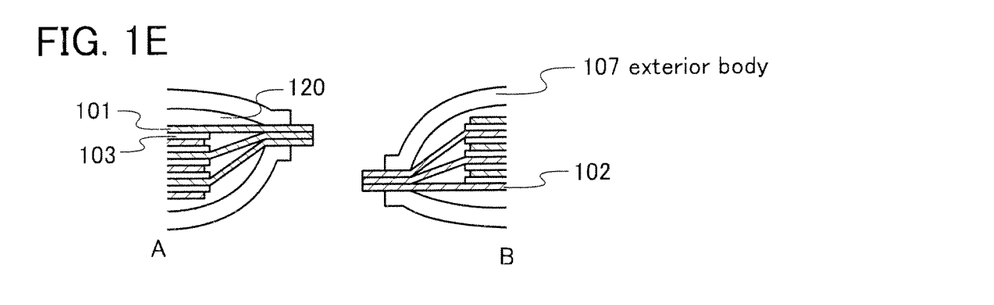

FIG. 1E is a schematic cross-sectional view taken along a dashed-dotted line A-B in FIG. 1A.

FIG. 1E illustrates that the electrode tab portions protrude from the exterior body 107 and three positive electrodes stacked and bonded by ultrasonic bonding are used as a terminal. In such an example, a terminal electrode can be formed without using a lead electrode.

Although the example in which the electrolytic solution 120 and three pairs of the positive and negative electrodes 101 and 102 are provided in the exterior body 107 is illustrated in FIG. 1E for simplicity of explanation in this embodiment, four or more pairs of the positive and negative electrodes 101 and 102 may be provided in the exterior body 107 to increase the capacity of the power storage unit. Alternatively, two pairs or one pair of the positive and negative electrodes 101 and 102 may be provided in the exterior body 107 to decrease the thickness of the power storage unit.

In order to prevent a short-circuit between the positive and negative electrodes in the central portion, an insulator is preferably provided between the electrode tab portions of the positive and negative electrodes.

An example of manufacturing the power storage unit 100 will be described below.

First, three positive electrodes (including current collectors having a shape illustrated in FIG. 1B), five separators (having a shape illustrated in FIG. 1C), and three negative electrodes (including current collectors having a shape illustrated in FIG. 1D) are prepared. Each of the positive electrodes 101 has a plurality of slit openings in addition to the opening in the central portion so that creases or the like are not easily formed in the positive electrode when the power storage unit is bent. Note that the positive electrode 101 includes a positive electrode active material layer on one side or positive electrode active material layers on both sides. Each of the negative electrodes 102 also has a plurality of slit openings in addition to the opening in the central portion so that creases or the like are not easily formed in the negative electrode when the power storage unit is bent. The negative electrode 102 includes a negative electrode active material layer on one side or negative electrode active material layers on both sides.

The current collectors used in the positive electrode 101 and the negative electrode 102 can each be formed using a highly conductive material which is not alloyed with a carrier ion of lithium or the like, such as a metal typified by stainless steel, gold, platinum, zinc, iron, nickel, copper, aluminum, titanium, or tantalum or an alloy thereof. Alternatively, an aluminum alloy to which an element capable of improving heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors preferably have a thickness greater than or equal to 5 μm and less than or equal to 40 μm.

A positive electrode active material layer is formed on one side, or both sides, of the current collector used in the positive electrode 101.

Examples of a positive electrode active material used for the positive electrode active material layer of the power storage unit 100 include a composite oxide with an olivine crystal structure, a composite oxide with a layered rock-salt crystal structure, a composite oxide with a spinel crystal structure, and the like. As the positive electrode active material, a compound such as $LiFeO_2$, $LiCoO_2$, $LiNiO_2$, $LiMn_2O_4$, $V_2O_5$, $Cr_2O_5$, and $MnO_2$ is used.

Alternatively, a composite material ($LiMPO_4$ (general formula) (M is one or more of Fe(II), Mn(II), Co(II), and Ni(II)) can be used. Typical examples of $LiMPO_4$ (general formula) are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a composite material such as $Li_{(2-j)}MSiO_4$ (general formula) (M is one or more of Fe(II), Mn(II), Co(II), and Ni(II), 0 j 2) can be used. Typical examples of $Li_{(2-j)}MSiO_4$ (general formula) include lithium compounds such as $Li_{(2-j)}FeSiO_4$, $Li_{(2-j)}CoSiO_4$, $Li_{(2-j)}MnSiO_4$, $Li_{(2-j)}Fe_kNi/SiO_4$, $Li_{(2-j)}Fe_kCo/SiO_4$, $Li_{(2-j)}Fe_kMn_lSiO_4$, $Li_{(2-j)}Ni_kCo/SiO_4$, $Li_{(2-j)}Ni_kMn_lSiO_4$ (k+l≤0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound represented by $A_xM_2(XO_4)_3$ (general formula) (A=Li, Na, or Mg, M=Fe, Mn, Ti, V, Nb, or Al, and X=S, P, Mo, W, As, or Si) can be used as the positive electrode active material. Examples of the NASICON compound include $Fe_2(MnO_4)_3$, $Fe_2(SO_4)_3$, and $Li_3Fe_2(PO_4)_3$. Still further alternatively, a compound represented by $Li_2MPO_4F$, $Li_2MP_2O_7$, or $Li_5MO_4$ (general formula) (M=Fe or Mn), a perovskite fluoride such as $NaFeF_3$ or $FeF_3$, a metal chalcogenide (a sulfide, a selenide, or a telluride) such as $TiS_2$ or $MoS_2$, an oxide with an inverse spinel crystal structure such as $LiMVO_4$, a vanadium oxide-based material (e.g., $V_2O_5$, $V_6O_{13}$, or $LiV_3O_8$), a manganese oxide, an organic sulfur, or the like can be used as the positive electrode active material.

In the case where carrier ions are alkali metal ions other than lithium ions or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material.

A negative electrode active material layer is formed on one side, or both sides, of the current collector used in the negative electrode 102.

A material with which lithium can be dissolved and precipitated or a material into and from which lithium ions can be inserted and extracted can be used as the negative electrode active material of the negative electrode active material layer in the power storage unit 100; for example, a lithium metal, a carbon-based material, or an alloy-based material can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material, an alloy-based material or an oxide which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used as an alloy-based material, for example. Such elements have higher capacity than carbon. In particular, silicon has a significantly high theoretical capacity of 4200 mAh/g. For this reason, silicon is preferably used for the negative electrode active material. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used. Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystalline silicon, $Si_2O_3$, $Si_3O_4$, $Si_2O$, and $SiO_2$. Thus, SiO can be distinguished from SiO$_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The negative electrode active material layer may further include a binder for increasing adhesion of active materials, a conductive additive for increasing the conductivity of the negative electrode active material layer, and the like in addition to the above-described negative electrode active material.

Then, the three pairs of the positive and negative electrodes 101 and 102 are stacked, and the positive electrodes are bonded to each other and the negative electrodes are bonded to each other. In other words, the negative electrode, the separator, the positive electrode, the separator, the negative electrode, the separator, the positive electrode, the separator, the negative electrode, the separator, and the positive electrode are stacked in this order as illustrated in FIG. 1E. Note that the positive electrodes are bonded and electrically connected to each other and the negative electrodes are bonded and electrically connected to each other by ultrasonic bonding or the like.

As the separator 103, an insulator such as cellulose (paper), polyethylene with pores, and polypropylene with pores can be used.

Next, a film is prepared for formation of the exterior body 107 in which the combination of the positive electrodes, the separators, and the negative electrodes is to be provided. In this embodiment, one stacked-layer film having two circular openings is used.

The film used for formation of the exterior body 107 is a single-layer film selected from a metal film (foil of a metal or an alloy such as aluminum, stainless steel, nickel steel, gold, silver, copper, titanium, nichrome, iron, tin, tantalum, niobium, molybdenum, zirconium, or zinc), a plastic film made of an organic material, a hybrid material film containing an organic material (e.g., an organic resin or fiber) and an inorganic material (e.g., ceramic), and a carbon-containing inorganic film (e.g., a carbon film or a graphite film), or a stacked-layer film including two or more of the above films.

In this embodiment, the stacked-layer film having the two circular openings is folded in the middle such that the two openings overlap with each other, and three sides are sealed with an adhesive layer. First, two sides of the film are sealed by thermocompression bonding, and one side is left open for introduction of an electrolytic solution. Edges of the openings are also sealed by thermocompression bonding, whereby a thermocompression bonded region 118b is formed. The thermocompression bonding is carried out with the electrode tab portions exposed in the openings.

After that, in a reduced-pressure atmosphere or an inert atmosphere, a desired amount of electrolytic solution is introduced to the inside of the film in the form of a bag. Lastly, the side of the film which has not been subjected to thermocompression bonding and is left open is sealed by thermocompression bonding, whereby a thermocompression bonded region 118a is formed.

As a supporting electrolyte in the electrolytic solution, a material in which carrier ions can transfer and which contains lithium ions serving as carrier ions is used. Typical examples of supporting electrolytes are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these supporting electrolytes may be used alone, or two or more of them may be used in an appropriate combination and in an appropriate ratio.

As a solvent of the electrolytic solution, a material in which carrier ions can transfer is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the secondary battery can be thinner and more lightweight. Typical examples of gelled high-molecular materials include a silicone gel, an acrylic gel, an acrylonitrile gel, a polyethylene oxide gel, a polypropylene oxide gel, a fluorine-based polymer gel, and the like. Alternatively, the use of one or more of ionic liquids (room temperature molten salts) which have features of non-flammability and non-volatility as a solvent of the electrolytic solution can prevent the secondary battery from exploding or catching fire even when the secondary battery internally shorts out or the internal temperature increases owing to overcharging and others. An ionic liquid is a salt in the fluid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

As other electrolytes, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

In this manner, the power storage unit 100 illustrated in FIG. 1A can be manufactured.

The power storage unit 100 has terminals in the central portion. Since the central portion of a secondary battery is fixed by thermocompression bonding, the amount of deformation with respect to deformation of the secondary battery can be decreased. In addition, since a lead electrode is not used, the number of components is decreased.

Although the square external shape is given in Embodiment 1 as an example of the external shape, the present invention is not particularly limited to this example. The external shape may be a rectangle having an opening in the central portion, a circle having an opening in the central portion, an ellipse having an opening in the central portion, or the like. The shape of the opening in the exterior body is not limited to the circle and may be a rectangle, a square, an ellipse, a polygon, or the like.

Embodiment 2

The circular opening is described as an example in Embodiment 1, whereas an opening having a shape different from that in Embodiment 1 will be described as an example in this embodiment.

This embodiment is the same as Embodiment 1, except for the shape of the opening and the positions of terminals, i.e., the shapes of the positive and negative electrodes. Therefore, in FIGS. 2A to 2D, the same reference numerals are used for the same parts as those in FIGS. 1A to 1D, and detailed description of the parts is omitted here for simplicity.

Figure 2A:
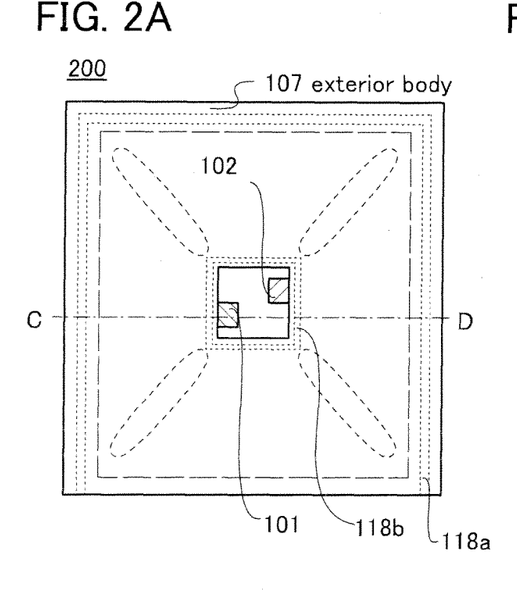
FIGS. 2A to 2D are top views illustrating one embodiment of the present invention.
Figure 2B:
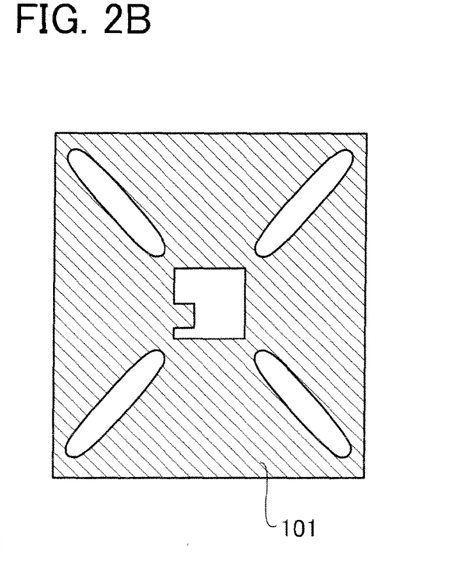
Figure 2C:
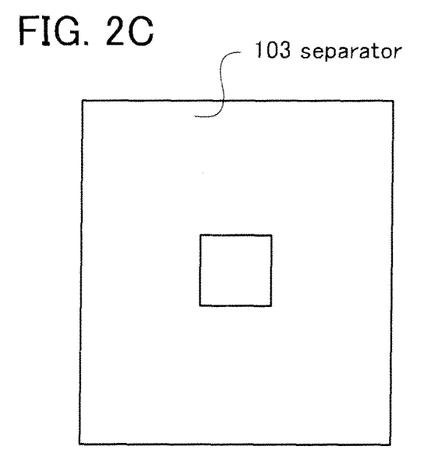
Figure 2D:
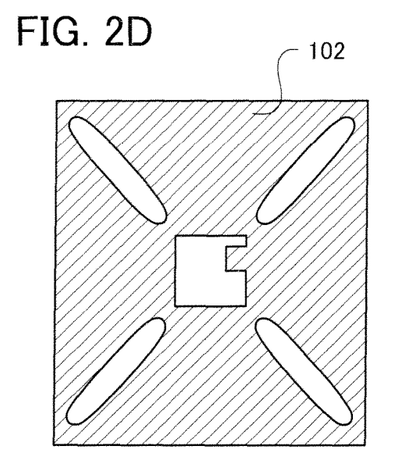

FIG. 2A illustrates an example of a top view of a power storage unit 200. FIG. 2B illustrates an upper surface shape of a positive electrode 101. FIG. 2C illustrates an upper surface shape of a separator 103. FIG. 2D illustrates an upper surface shape of a negative electrode 102.

The power storage unit 200 of one embodiment of the present invention includes at least the positive electrode 101, the separator 103, the negative electrode 102, and an electrolytic solution in an exterior body 107 having an opening.

In this embodiment, portions of the positive and negative electrodes 101 and 102 which are exposed in the opening in the exterior body 107 (positive and negative electrode tab portions) are not aligned to prevent a short-circuit.

The shape of the opening in the exterior body 107 is a rectangle or a square, and the opening is surrounded by a thermocompression bonded region 118b.

Figure 3:
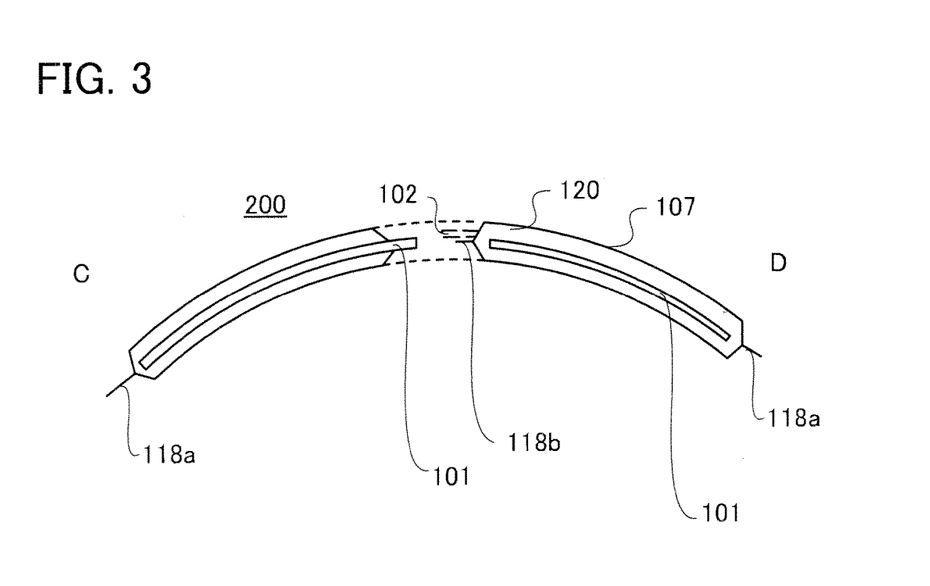
FIG. 3 is a cross-sectional view illustrating one embodiment of the present invention.

FIG. 3 is a schematic cross-sectional view of the power storage unit 200 which is bent. FIG. 3 is a cross-sectional view taken along a dashed-dotted line CD in FIG. 2A, and the same portions as those in FIGS. 2A to 2D are denoted by the same reference numerals. In FIG. 3, the negative electrode and the separator provided in the exterior body 107 are not illustrated. Note that only one positive electrode 101 is illustrated.

In the case where the power storage unit 200 is bent as illustrated in FIG. 3, the amount of change in the central portion and the thermocompression bonded region 118b is smaller than that in a thermocompression bonded region 118a. The power storage unit 200 in which the electrode tab portions are provided in the portion with a small amount of change is resistant to bending.

Since the power storage unit 200 has the opening in the central portion, the power storage unit 200 itself is partly easily bendable.

In addition, since there is a space in the central portion as illustrated in FIG. 3, connection to a lead line can be achieved in this portion, or a circuit board smaller than the opening of the exterior body 107 can be provided. In the case where a plurality of positive electrodes 101 are stacked, the capacity can be increased. Although the thickness also increases, the space in the central portion increases as well. Thus, more elements or circuits can be provided in the central portion. In this manner, in the power storage unit 200 having the opening in the central portion, the space in the central portion can be effectively utilized.

This embodiment can be freely combined with Embodiment 1.

Embodiment 3

In this embodiment, examples in which the power storage unit described in Embodiment 1 or 2 is mounted in an electronic device will be described with reference to FIGS. 4A to 4C.

Figure 4A:
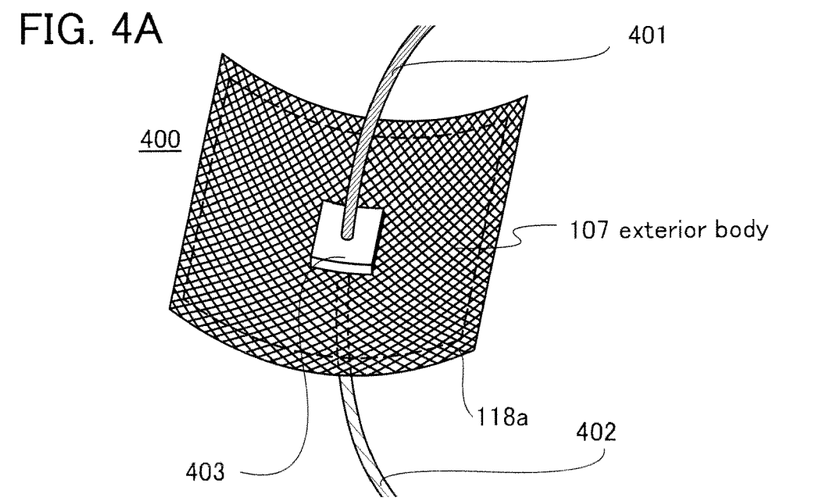
FIGS. 4A to 4C are perspective views and a cross-sectional view illustrating one embodiment of the present invention.

A power storage unit 400 illustrated in FIG. 4A is connected to a socket 403, a lead line 401 which is connected to a positive electrode, and a lead line 402 which is connected to a negative electrode.

In the socket 403, a positive electrode tab and the lead line 401 are connected by welding, a negative electrode tab and the lead line 402 are connected by welding, and an insulator for preventing a short-circuit is provided therebetween.

The socket 403 may include a circuit for preventing overcharge or the like which is connected to the lead lines.

Figure 4B:
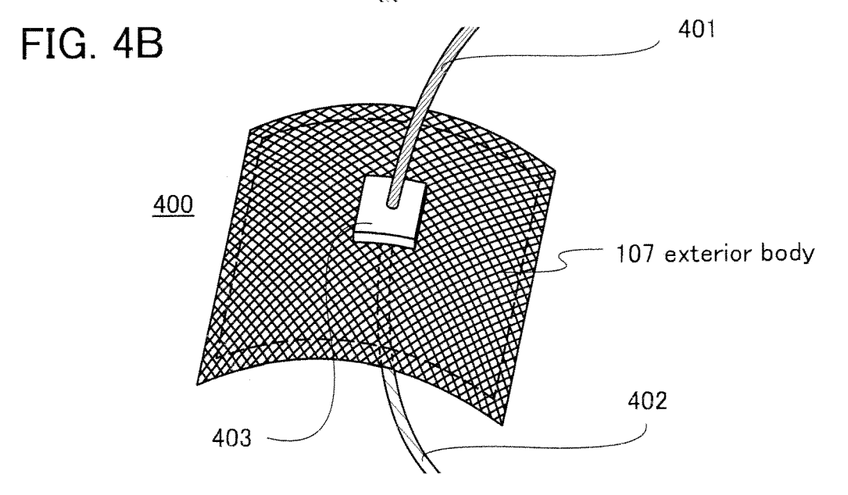

FIG. 4B illustrates an example in which the power storage unit is bent in a different direction. Even when the power storage unit is bent in a different direction, the amount of change in the central portion is smaller than that in the other portions. An exterior body 107 of the power storage unit 400 is embossed so that the power storage unit 400 can be easily bent. Accordingly, even when the power storage unit 400 is repeatedly bent from the state in FIG. 4A to the state in FIG. 4B, the amount of change in the central portion is small and the other portions are easily bendable.

The depressions or projections of a front surface (or a back surface) of the film formed by embossing form an obstructed space that is sealed by the film serving as a part of a wall of the sealing structure and whose inner volume is variable. This obstructed space can also be said to be formed because the depressions or projections of the film have an accordion structure (bellows structure). Note that embossing, which is a kind of pressing, is not necessarily employed and any method that allows formation of a relief on part of the film is employed.

FIGS. 4A and 4B illustrate the example in which the lead line 401 connected to the positive electrode and the lead line 402 connected to the negative electrode are led out to different sides. However, the present invention is not limited to this example, and both the lead lines 401 and 402 can be lead out to the same side.

A power storage unit in which a film is used as an exterior body is normally not used alone. A plurality of power storage units are connected in series or in parallel, provided with a circuit for preventing overcharge or the like, and mounted in an electronic device as a single battery pack.

For example, two power storage units 400 can be connected in series by a connector which is provided therebetween and capable of connecting the two power storage units 400 such that their central portions overlap with each other. In the case of such serial connection, upper and lower units can be electrically connected to each other with the central portions fixed so as to overlap with each other.

In the case where three or more power storage units 400 are stacked, the units can be connected in series similarly. Furthermore, a battery pack can be manufactured by connecting a plurality of power storage units 400 in series. Since the plurality of power storage units 400 are individually easily bendable even when stacked, a bendable battery pack can be obtained.

In the case where a lead electrode is mounted in a folded state, it requires area and space. However, no lead electrode is required for the power storage unit described in this embodiment. Thus, a plurality of power storage units can be mounted in a small space.

Figure 4C:
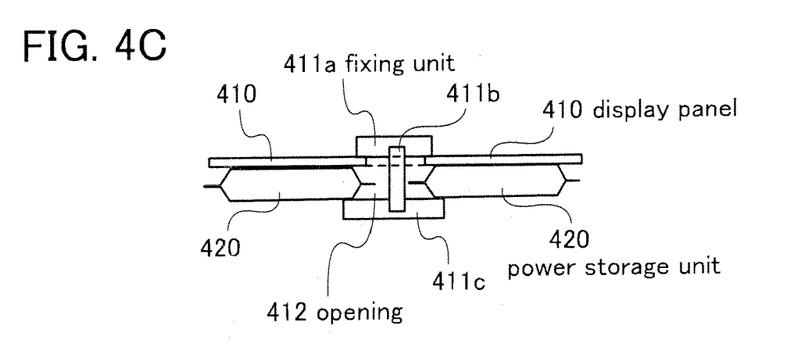

FIG. 4C illustrates another mounting example. In FIG. 4C, a display panel and a power storage unit are stacked and fixed. A display panel 410 having an opening in the central portion of a display region thereof and a power storage unit 420 having an opening 412 are stacked such that the opening of the display panel 410 and the opening 412 overlap with each other. As fixing units 411a, 411b, and 411c, a screw, a bolt, or the like is used, and an insulator is preferably used as a material of the fixing units so as to prevent a short-circuit of a terminal of the power storage unit. A conductive material can also be used for the fixing units when an insulating film is formed on a surface of the fixing units.

Although a structure for electrical connection between the power storage unit 420 and the display panel is not illustrated in FIG. 4C, the power storage unit 420 and the display panel can be connected in the opening 412.

In the case where the display panel 410 having the opening is flexible, the power storage unit 420 having the opening may also be flexible. The display panel 410 and the power storage unit 420 can be fixed to each other using their openings by means of the fixing units 411a, 411b, and 411c, whereby a durable electronic device can be obtained.

The display panel 410 may be an inflexible panel.

The display panel includes, as a display element, at least one of an EL element (e.g., an EL element including organic and inorganic materials, an organic EL element, or an inorganic EL element), an LED (e.g., a white LED, a red LED, a green LED, and a blue LED), a transistor (a transistor which emits light depending on current), an electron emitter, a liquid crystal element, electronic ink, an electrophoretic element, a grating light valve (GLV), a plasma display panel (PDP), a display element using a micro electro mechanical system (MEMS), a digital micromirror device (DMD), a digital micro shutter (DMS), an interferometric modulator display (IMOD), a MEMS shutter display element, an optical-interference-type MEMS display element, an electrowetting element, a piezoelectric ceramic display, and a display element including a carbon nanotube. Other than the above, the display panel may include a display medium whose contrast, luminance, reflectance, transmittance, or the like is changed by an electric or magnetic effect. Examples of display devices having an EL element include an EL display. Examples of display devices having an electron emitter include a field emission display (FED) and an SED-type flat panel display (SED: surface-conduction electron-emitter display). Examples of display panels having a liquid crystal element include a liquid crystal display (e.g., a transmissive liquid crystal display, a transflective liquid crystal display, a reflective liquid crystal display, a direct-view liquid crystal display, or a projection liquid crystal display). Examples further include a display panel having electronic ink, Electronic Liquid Powder (registered trademark), or an electrophoretic element, such as electronic paper. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption.

This embodiment can be freely combined with Embodiment 1 or 2.

Embodiment 4

In this embodiment, examples of electronic devices incorporating any of the power storage units described in Embodiments 1 to 3 will be described.

Examples of electronic devices including the power storage unit are as follows: display devices (also referred to as televisions or television receivers) such as head mounted displays and goggle type displays, desktop personal computers, laptop personal computers, monitors for computers or the like, digital cameras, digital video cameras, digital photo frames, electronic notebooks, e-book readers, electronic translators, toys, audio input devices such as microphones, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, alarm devices such as smoke detectors, gas alarm devices, and security alarm devices, industrial robots, health equipment and medical equipment such as hearing aids, cardiac pacemakers, X-ray equipment, radiation counters, electric massagers, and dialyzers, mobile phones (also referred to as mobile phone devices or cell phones), portable game machines, portable information terminals, lighting devices, headphones, stereos, remote controllers, clocks such as table clocks and wall clocks, cordless phone handsets, transceivers, pedometers, calculators, portable or stationary music reproduction devices such as digital audio players, and large game machines such as pachinko machines.

The power storage unit described in any of Embodiments 1 to 3 includes, as an exterior body, a thin film having flexibility and thus can be bonded to a support structure body with a curved surface and can change its form along the curved surface of a region of the support structure body that has a large radius of curvature.

In addition, a flexible power storage unit can be incorporated along a curved inside/outside wall surface of a house or a building or a curved interior/exterior surface of a car.

Figures 5A, 5B, 5C:
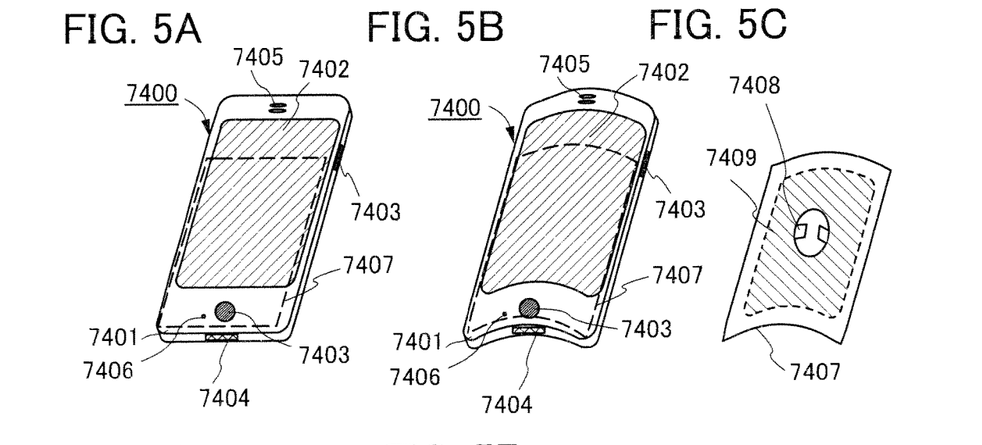
FIGS. 5A to 5H each illustrate an electronic device of one embodiment of the present invention.

FIG. 5A illustrates an example of a mobile phone. A mobile phone 7400 is provided with a display portion 7402 incorporated in a housing 7401, operation buttons 7403, an external connection port 7404, a speaker 7405, a microphone 7406, and the like. Note that the mobile phone 7400 includes a power storage unit 7407.

FIG. 5B illustrates the mobile phone 7400 that is bent. When the whole mobile phone 7400 is bent by external force, the power storage unit 7407 included in the mobile phone 7400 is also bent. FIG. 5C illustrates the bent power storage unit 7407. The power storage unit 7407 is a laminated storage battery (also referred to as a layered battery or a film-covered battery). The power storage unit 7407 is fixed while being bent. Note that the power storage unit 7407 includes a lead electrode 7408 electrically connected to a current collector 7409. For example, a film serving as an exterior body of the power storage unit 7407 has an opening, so that the power storage unit 7407 has high reliability even when bent. The mobile phone 7400 may further be provided with a slot for insertion of a SIM card, a connector portion for connecting a USB device such as a USB memory, and the like.

Figures 5D, 5E:
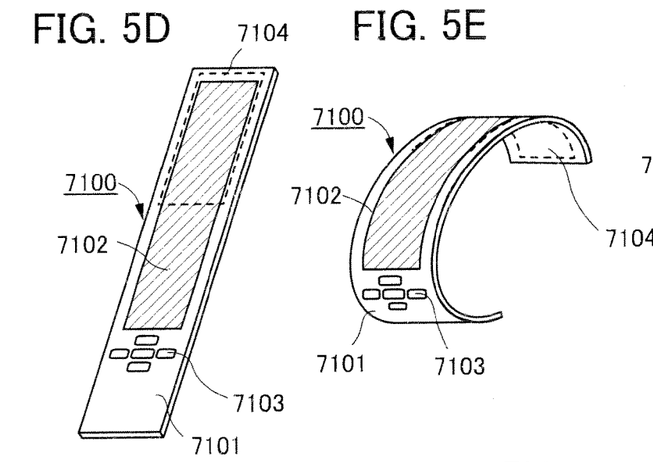
Figure 5F:
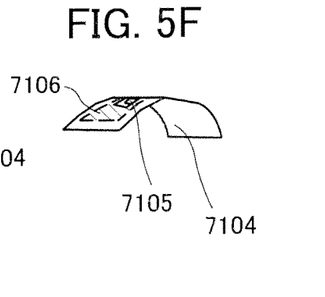

FIG. 5D illustrates an example of a mobile phone that can be bent. When bent to be put around a forearm, the mobile phone can be used as a bangle-type mobile phone as in FIG. 5E. A mobile phone 7100 includes a housing 7101, a display portion 7102, an operation button 7103, and a power storage unit 7104. FIG. 5F illustrates the power storage unit 7104 that can be bent. When the mobile phone is worn on a user's arm while the power storage unit 7104 is bent, the housing changes its form and the curvature of part or the whole of the power storage unit 7104 is changed. Specifically, part or the whole of the housing or the main surface of the power storage unit 7104 is changed in the range of radius of curvature from 10 mm to 150 mm. Note that the power storage unit 7104 includes a lead electrode 7105 that is electrically connected to a current collector 7106. For example, the film serving as the exterior body of the power storage unit 7104 has an opening, and thus high reliability is retained even when the power storage unit 7104 is bent many times with different curvatures. As described above, the mobile phone illustrated in FIG. 5D can be changed in form in more than one way, and it is desirable that at least the housing 7101, the display portion 7102, and the power storage unit 7104 have flexibility in order to change the form of the mobile phone.

The mobile phone 7100 may further be provided with a slot for insertion of a SIM card, a connector portion for connecting a USB device such as a USB memory, and the like.

Figure 5G:
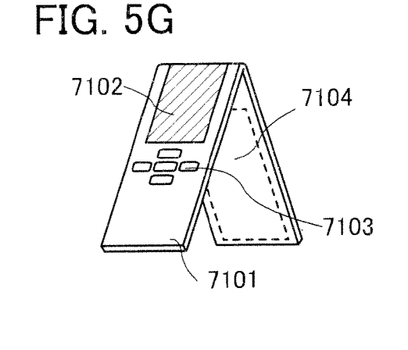
Figure 5H:
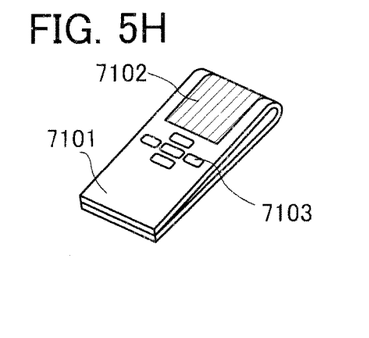

As for another usage example of the mobile phone, when the mobile phone illustrated in FIG. 5D is folded in the middle, a form illustrated in FIG. 5G can be obtained. When the mobile phone is further folded in the middle so that end portions of the mobile phone overlap with each other as illustrated in FIG. 5H, the mobile phone can be reduced in size so as to be put in, for example, a pocket of clothes a user wears. In the cases of only changes in form illustrated in FIGS. 5D, 5G, and 5H, the power storage unit 7104 is not being bent.

Figure 6A:
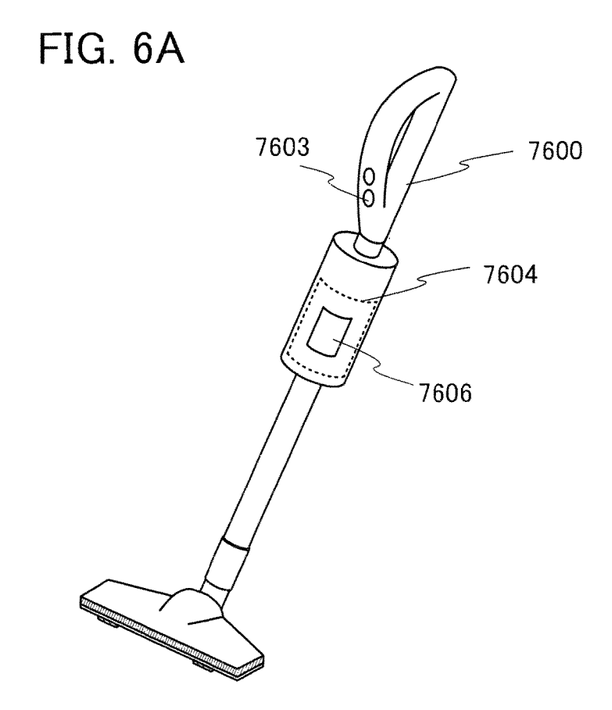
FIGS. 6A to 6C each illustrate an electronic device of one embodiment of the present invention.

FIG. 6A illustrates an example of a vacuum cleaner. By being provided with a secondary battery, the vacuum cleaner can be cordless. To secure a dust collecting space for storing vacuumed dust inside the vacuum cleaner, a space occupied by a power storage unit 7604 is preferably as small as possible. For this reason, it is useful to provide the thin power storage unit 7604 that can be bent, between the outside surface and the dust collecting space.

Figure 6B:
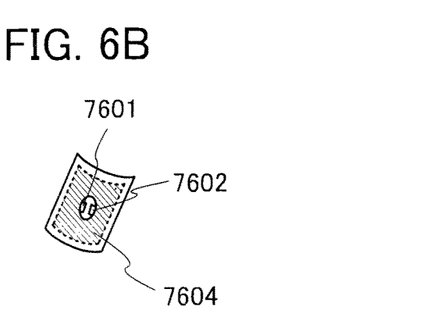

A vacuum cleaner 7600 is provided with operation buttons 7603 and the power storage unit 7604. FIG. 6B illustrates the power storage unit 7604 that is capable of being bent. An opening is provided in a film serving as an exterior body of the power storage unit 7604, so that the power storage unit 7604 has high reliability even when bent. The power storage unit 7604 includes a lead electrode 7601 electrically connected to a negative electrode and a lead electrode 7602 electrically connected to a positive electrode.

The thin power storage unit 7604 can be manufactured by the method for manufacturing a laminated secondary battery that is described in Embodiment 1.

The thin power storage unit 7604 has a laminated structure and is bent and fixed. The vacuum cleaner 7600 includes a display portion 7606 that displays, for example, the amount of power remaining in the thin power storage unit 7604. A display area of the display portion 7606 is curved to fit the shape of the outer surface of the vacuum cleaner. The vacuum cleaner includes a connection cord for being connected to an electrical outlet. When the thin power storage unit 7604 is charged to have sufficient power, the connection cord can be removed from the electrical outlet to use the vacuum cleaner. The thin power storage unit 7604 may be charged wirelessly without using the connection cord. The film serving as the exterior body of the power storage unit 7604 has an opening, so that the power storage unit 7604 has high reliability.

Figure 6C:
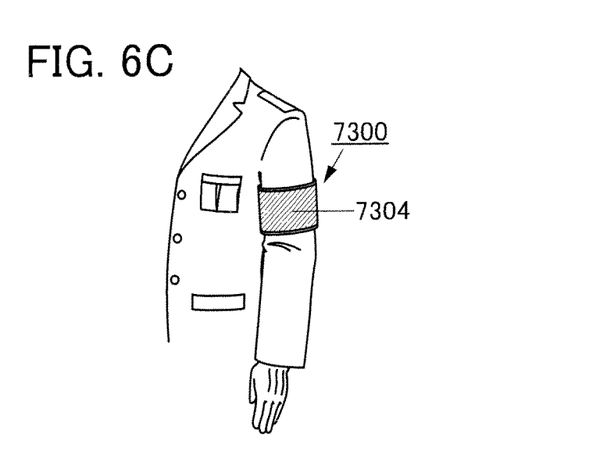
Figure 7A:
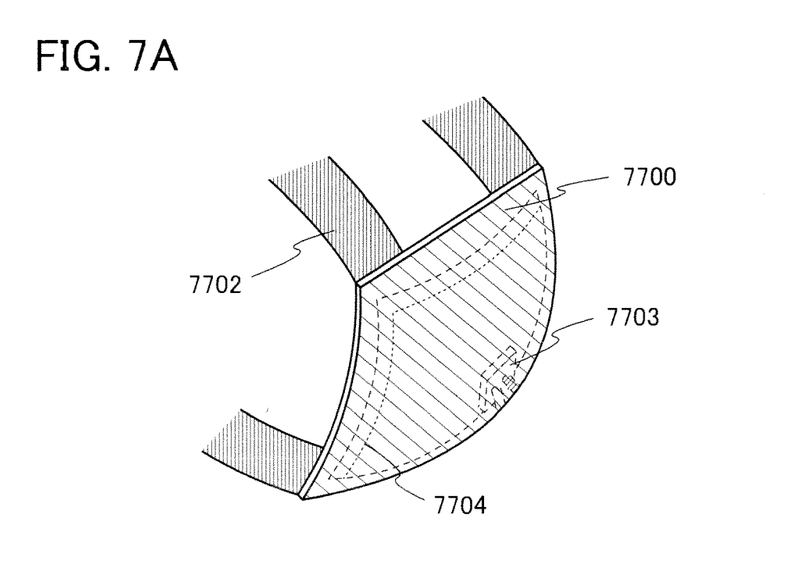
FIGS. 7A and 7B each illustrate an electronic device of one embodiment of the present invention.
Figure 7B:
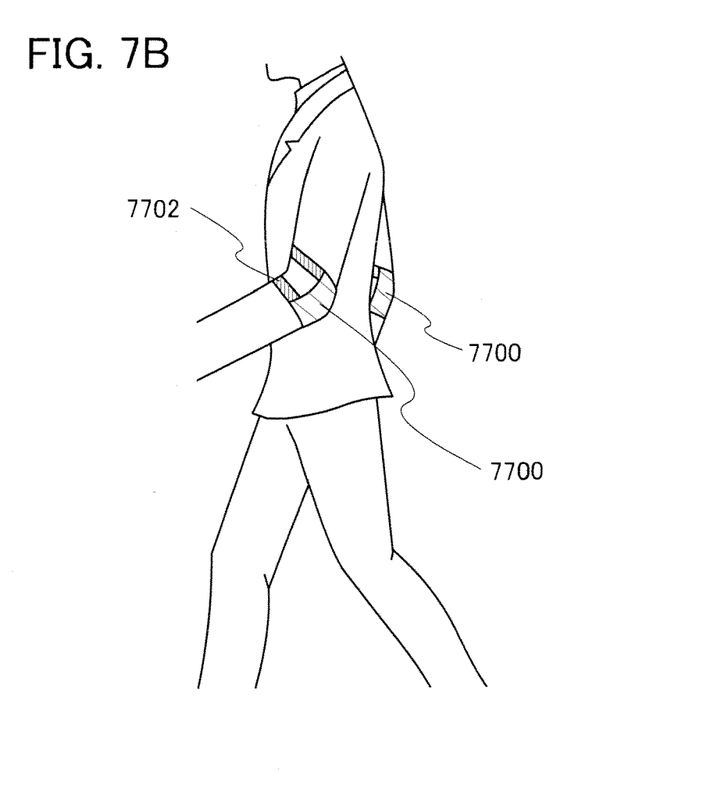

FIGS. 6C, 7A, and 7B illustrate examples of electronic devices which can be put on part of a human body.

The power storage unit described in any of Embodiments 1 to 3 can be bent so as to fit part of a human body having a complex curved surface such as a spherical surface.

FIG. 6C illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input/output terminal, and data can be directly transmitted to and received from another information terminal via a connector. In addition, charging via the input output terminal is possible. Note that the charging operation may be performed by wireless power feeding without using the input/output terminal.

An electronic device 7700 illustrated in FIG. 7A is a lighting device which includes a band 7702 for fixing the lighting device to part of a human body, a flexible lighting device (an EL lighting device including an EL element), and a power storage unit 7704 electrically connected to the lighting device through a connector 7703.

FIG. 7B illustrates that two electronic devices 7700 are put on elbows during walking or running at night. The electronic devices 7700 and the power storage units 7704, which are power sources for the electronic devices, can be bent in conformity with the movement of arms.

Alternatively, instead of using the band as in FIG. 7B, the electronic device may be provided in part of clothes. Furthermore, the electronic device may include a clock function, a temperature sensor, or the like in addition to the lighting device.

The use of bendable power storage units in vehicles enables production of next-generation clean energy vehicles such as hybrid electric vehicles (HEVs), electric vehicles (EVs), and plug-in hybrid electric vehicles (PHEVs). Moreover, bendable power storage units can also be used in moving objects such as agricultural machines, motorized bicycles including motor-assisted bicycles, motorcycles, electric wheelchairs, electric carts, boats or ships, submarines, aircrafts such as fixed-wing aircrafts and rotary-wing aircrafts, rockets, artificial satellites, space probes, planetary probes, and spacecrafts.

This application is based on Japanese Patent Application serial no. 2014-107546 filed with Japan Patent Office on May 23, 2014, the entire contents of which are hereby incorporated by reference.

What is claimed is:

1. A secondary battery comprising:
   a first current collector electrically connected to a first lead line;
   a second current collector electrically connected to a second lead line, the second current collector overlapping with the first current collector;
   an exterior body including a first surface and a second surface opposite to the first surface; and
   an electrolyte between the first current collector and the second current collector,
   wherein the electrolyte is enveloped by the exterior body,
   wherein an opening defined through the first current collector, the second current collector, the exterior body, and the electrolyte permits passing of an object through the opening,
   wherein the first lead line is led out to the first surface and the second lead line is led out to the second surface from the opening, and
   wherein the exterior body includes a film.

2. The secondary battery according to claim 1, further comprising a separator between the first current collector and the second current collector.

3. The secondary battery according to claim 1, wherein the first current collector comprises a plurality of first openings arranged in point-symmetric with respect to a center of the exterior body.

4. The secondary battery according to claim 3, wherein the second current collector comprises a plurality of second openings each overlapping with one of the plurality of first openings.

5. The secondary battery according to claim 1, wherein the opening is provided in a central portion of the exterior body.

6. The secondary battery according to claim 1,
   wherein the secondary battery is flexible.

7. The secondary battery according to claim 1,
   wherein edges of the opening and four outer sides of the exterior body are sealed by thermocompression bonding.

8. The secondary battery according to claim 1,
   wherein the film is folded to have one folded side and three outer sides of the exterior body, and
   wherein edges of the opening and the three outer sides of the exterior body are sealed by thermocompression bonding.

9. A secondary battery comprising:
   a first current collector electrically connected to a first lead line;

a second current collector electrically connected to a second lead line, the second current collector overlapping with the first current collector;

an exterior body; and an electrolyte between the first current collector and the second current collector, wherein the electrolyte is enveloped by the exterior body, wherein a through-hole defined through the first current collector, the second current collector, the exterior body, and the electrolyte permits passing of an object through the through-hole, wherein the first lead line and the second lead line protrude into the through-hole, and wherein the exterior body includes a film.

10. The secondary battery according to claim 9, further comprising a separator between the first current collector and the second current collector.

11. The secondary battery according to claim 9, wherein the first current collector comprises a plurality of first openings arranged in point-symmetric with respect to a center of the exterior body.

12. The secondary battery according to claim 11, wherein the second current collector comprises a plurality of second openings each overlapping with one of the plurality of first openings.

13. The secondary battery according to claim 9, wherein the through-hole in the exterior body is provided in a central portion of the exterior body.

14. The secondary battery according to claim 9, wherein the exterior body includes a first surface and a second surface opposite to the first surface, and wherein the first lead line is led out to the first surface and the second lead line is led out to the second surface from the through-hole.

15. The secondary battery according to claim 9, wherein the secondary battery is flexible.

16. The secondary battery according to claim 9, wherein edges of the through-hole and four outer sides of the exterior body are sealed by thermocompression bonding.

17. The secondary battery according to claim 9, wherein the film is folded to have one folded side and three outer sides of the exterior body, and wherein edges of the through-hole and the three outer sides of the exterior body are sealed by thermocompression bonding.

* * * * *